United States Patent
Sutar et al.

(10) Patent No.: US 8,966,764 B2
(45) Date of Patent: Mar. 3, 2015

(54) METHOD OF FABRICATING A ROLL-OVER PROTECTION STRUCTURE

(71) Applicant: Caterpillar Inc., Peoria, IL (US)

(72) Inventors: Nilesh A. Sutar, Peoria, IL (US); Prashant Bulusu, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/628,078

(22) Filed: Sep. 27, 2012

(65) Prior Publication Data
US 2014/0084628 A1 Mar. 27, 2014

(51) Int. Cl.
*B21D 53/88* (2006.01)
(52) U.S. Cl.
USPC .......................................................... 29/897.2
(58) Field of Classification Search
CPC .................................................. B60G 2206/012
USPC ........................................................ 29/897.2
See application file for complete search history.

(56) References Cited

U.S. PATENT DOCUMENTS

| 4,135,756 | A | | 1/1979 | Hausmann |
| 5,816,625 | A | * | 10/1998 | Clarke ........................... 285/305 |
| 6,052,957 | A | | 4/2000 | Minnich |
| 7,712,824 | B2 | | 5/2010 | Mori |
| 7,959,219 | B2 | | 6/2011 | Namura |
| 2002/0171240 | A1 | * | 11/2002 | Cwik ............................. 285/301 |
| 2013/0049339 | A1 | * | 2/2013 | Kwon et al. ................... 280/756 |

FOREIGN PATENT DOCUMENTS

| DE | 2601995 | 7/1977 |
| JP | 2006240568 | 9/2006 |

* cited by examiner

*Primary Examiner* — Moshe Wilensky
(74) *Attorney, Agent, or Firm* — Miller, Matthias & Hull (57) ABSTRACT

A roll-over protective structure for a frame structure of a cab assembly including an outer tube and an inner tube disposed within the outer tube at a pre-determined location to define a composite tube. The composite tube has an upright support with an end portion, and a transverse support connecting the upright support to define a curved corner. Further, the composite tube may have a U-shaped configuration. The composite tube may be further shaped through a hydroforming process to achieve a desired cross-section at the pre-determined location. For example, the curved corner may have a first cross-section, and the end portion may have a second cross-section.

24 Claims, 7 Drawing Sheets

FIG. 12

METHOD OF FABRICATING A ROLL-OVER PROTECTION STRUCTURE

TECHNICAL FIELD

The present disclosure relates generally to a roll-over protection structure, and more particularly related to a roll-over protection structure for use in a cab assembly of a machine.

BACKGROUND

In the construction of modern day cab assemblies, it is a common practice to build the cab around a very structurally sound framework. The framework is intended to withstand tremendous forces that would be applied to the cab in the event that the vehicle to which the cab was attached should happen to roll over. This structure must be able to withstand forces at least equal to the weight of the vehicle to prevent the occupant of the cab from being crushed as the vehicle rolls over. This structure is commonly known as a roll-over protective structure or ROPS. Current ROPS structures include local gussets, plates, other external structural reinforcement that are each welded separately. U.S. Pat. No. 4,135,756 discloses a ROPS, a square section tube-type truss or support is reinforced by a round-section tube which fits snuggly into the first tube (or vice versa). The reinforcement enables the use of only one roll-over frame and the use of the same cab assemblies on light and heavy machines. However, there is still room for improvement in the art.

SUMMARY

In an aspect, a roll-over protective structure for a frame structure of a cab assembly. The roll-over protective structure can include an outer tube and an inner tube disposed within the outer tube at at least one pre-determined location to define a composite tube. The composite tube can have an upright support with an end portion, and a transverse support connecting the upright support to define a curved corner. The inner tube sleeve can be fixedly attached with the inner wall of the outer tube forming a composite tube. Further, the composite tube can be bent to form a U-shaped configuration. The composite tube can be further shaped by a hydroforming process to achieve a desired cross-section at the pre-determined location. In one example, the pre-determined location is the curved corner and the curved corner may have a different cross-sectional shape than another portion of the composite tube.

In another aspect, the roll-over protective structure includes an outer tube, and one or more inner tubes disposed within the outer tube at one or more pre-determined locations to define a composite tube. The composite tube has a U-shaped configuration including two upright supports having corresponding end portions, and a transverse support interconnecting the upright supports to define two curved corners. At least one pre-determined location includes one of the curved corners.

In another aspect, a method of fabricating a roll-over protective structure is disclosed. One step may include placing an inner tube within an outer tube at a pre-determined location to form a composite tube. Another step may include bending the composite tube such that the composite tube includes an end portion and a curved corner. Another step may include hydroforming the composite tube to achieve a desired cross-section at the pre-determined location.

Other features and aspects of this disclosure will be apparent from the following description and the accompanying drawings.

DETAILED DESCRIPTION

Figure 1:
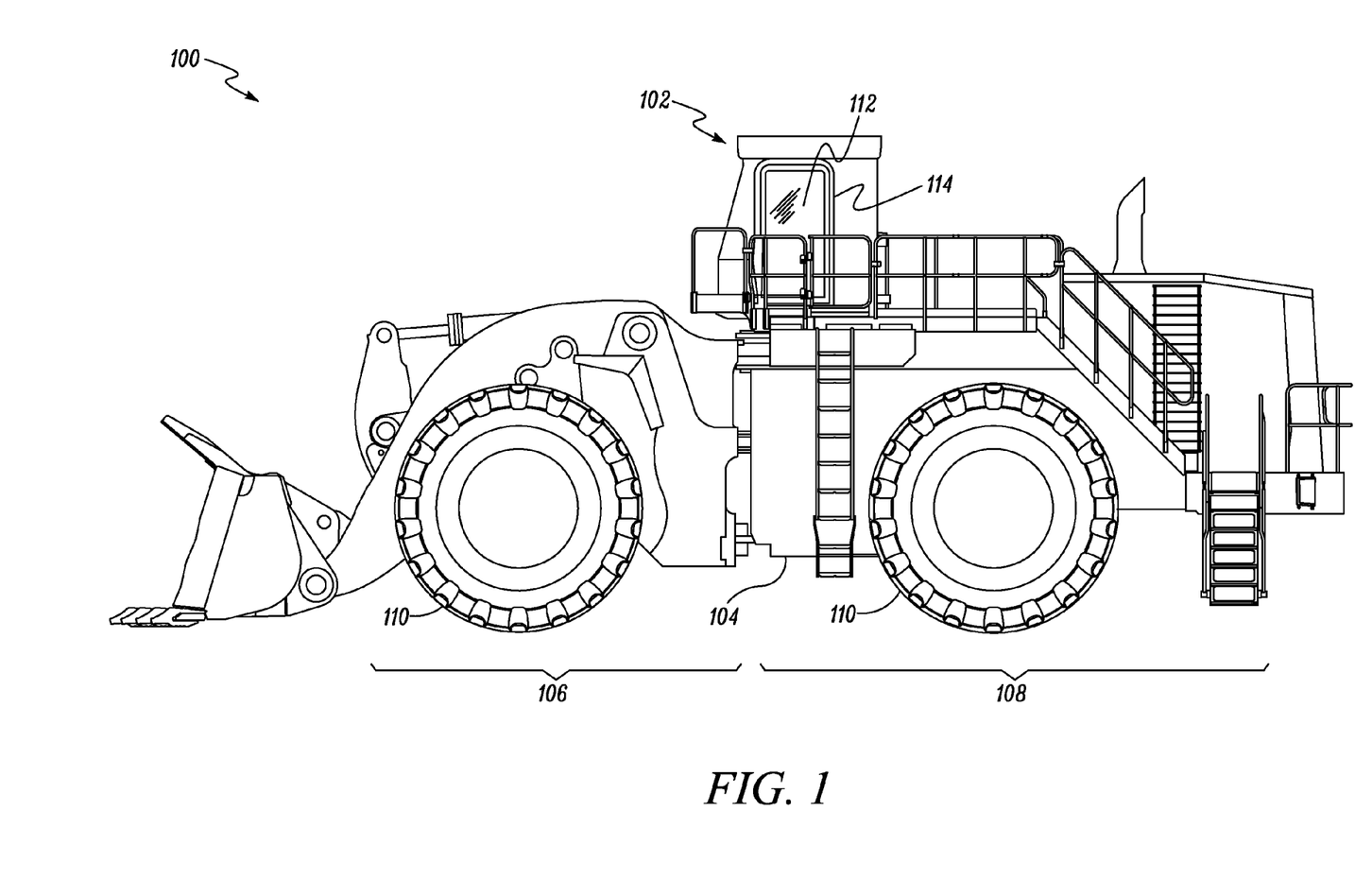
FIG. 1 illustrates a side view of a machine with a cab assembly.

The present disclosure relates to a roll-over protection structure adapted for use in a cab assembly of a machine or a vehicle. FIG. 1 illustrates a side view of a machine 100 with a cab assembly 102. Although, the machine 100 is embodied as the wheel loader, the machine 100 may be, but not limited to, an off-highway truck, on-highway truck, a backhoe loader, an industrial loader, a skid loader, a wheel tractor, an excavator, a wheel dozer, an articulated truck, a asphalt paver, a cold planer, a compactor, a feller buncher, a forest machine, a forwarder, a harvester, a motor grader, a hydraulic shovel, a road reclaimer, a tele-handler, a mining machine or the like. The machine 100 may be used for lifting and/or handling a load and may be employed in various industries such as, but not limited to, construction and mining. In the illustrated embodiment, the machine 100 includes a frame 104 to support various parts such as, a power source, for example an engine, lift linkages, power trains, hydraulic pumps, motors, valves, hydraulic lines, and a hydraulic tank. The frame 104 may include a front portion 106 and a rear portion 108 and supported by a plurality of wheels 110.

The cab assembly 102 is mounted on the rear portion 108 of the frame 104 enclosing an operator compartment 112. The operator compartment 112 may include a plurality of control devices, such as joysticks, user interfaces, controls and other type of display and input devices to control various operations associated with the machine 100. In an aspect of the present disclosure, the cab assembly 102 may be made of roll-over protection structures (ROPS) 114 which provide safety for an operator during an accidental roll-over of the machine 100.

Figure 2:
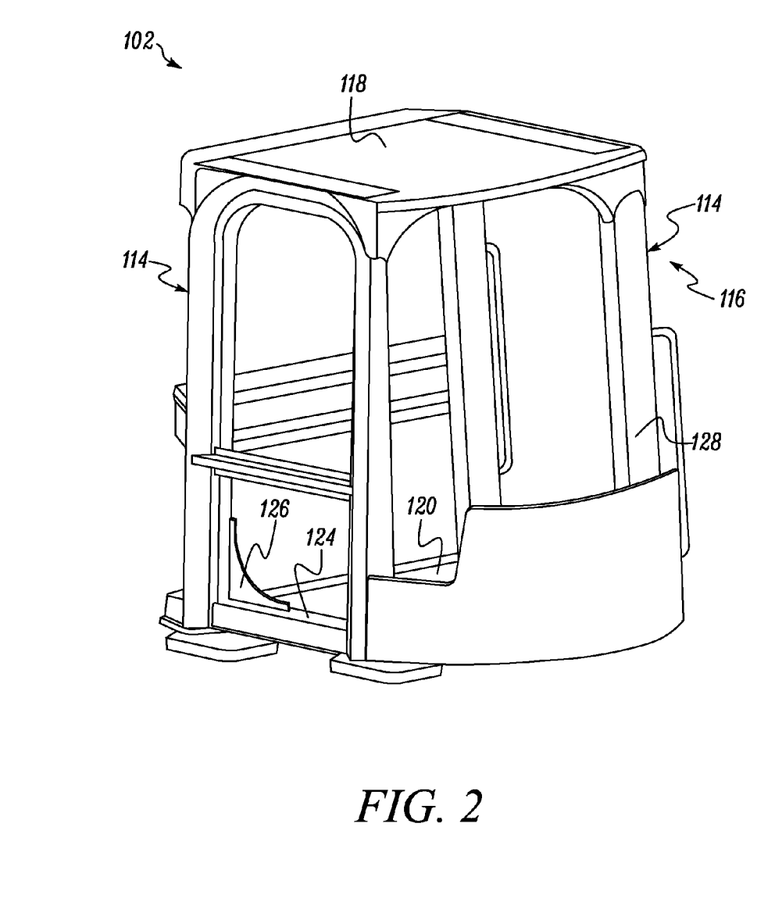
FIG. 2 is a perspective view of a cab assembly.

FIG. 2 is a perspective view of one example of the cab assembly 102. The cab assembly may include a frame structure 116 having an upper frame portion 118 and a lower frame portion 120, which may be substantially rectangular in configuration. In an embodiment, the upper frame portion 118 may be relatively smaller than the lower frame portion 120. Alternatively, the respective frame portions may have substantially identical structure. The lower frame portion 120 may be configured to be mounted on the rear portion 108 of the machine 100 by an attachment mechanism, such as, e.g., mechanical fasteners, welding, or the like. The cab assembly 102 may include a frame structure 116 made of the ROPS 114, such as shown, for example, in FIG. 3.

Figure 3:
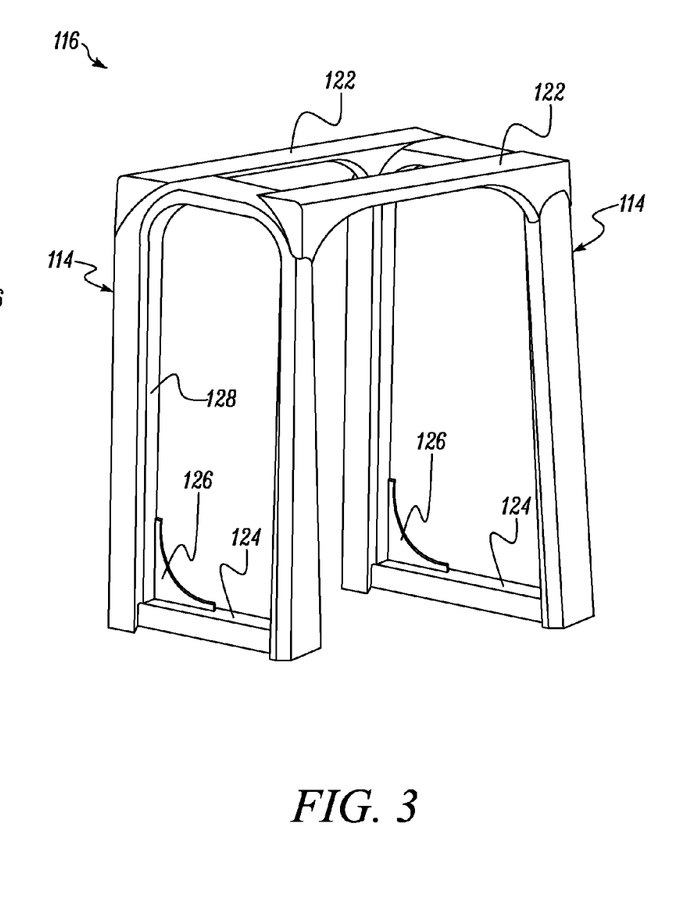
FIG. 3 illustrates a perspective view of a frame structure of the cab assembly.

FIG. 3 illustrates a perspective view of the frame structure 116 with the upper portion 118 and the lower portion 120 removed, to illustrate the ROPS 114 that form the frame structure 116 of the cab assembly 102. As illustrated in FIG. 3, the frame structure 116 includes respective pair of horizontally disposed top and bottom side supports 122, 124 to support the upper and the lower frame portion 118, 120 (see FIG. 2). The top and bottom side supports 122, 124 may be fixedly attached to the ROPS 114 by an attachment mechanism, such as, e.g., mechanical fasteners, welding, or the like. The top side support 122 may interconnect the top of the ROPS 114, while the bottom side support 124, may extend across the bottom of each ROPS 114. The top and bottom side supports 122, 124 may be formed of hollow or solid tubular post members. Further, gusset members 126 may be provided to rigidly support the bottom side supports 124 with the ROPS 114.

Figures 4, 5, 6, 7:
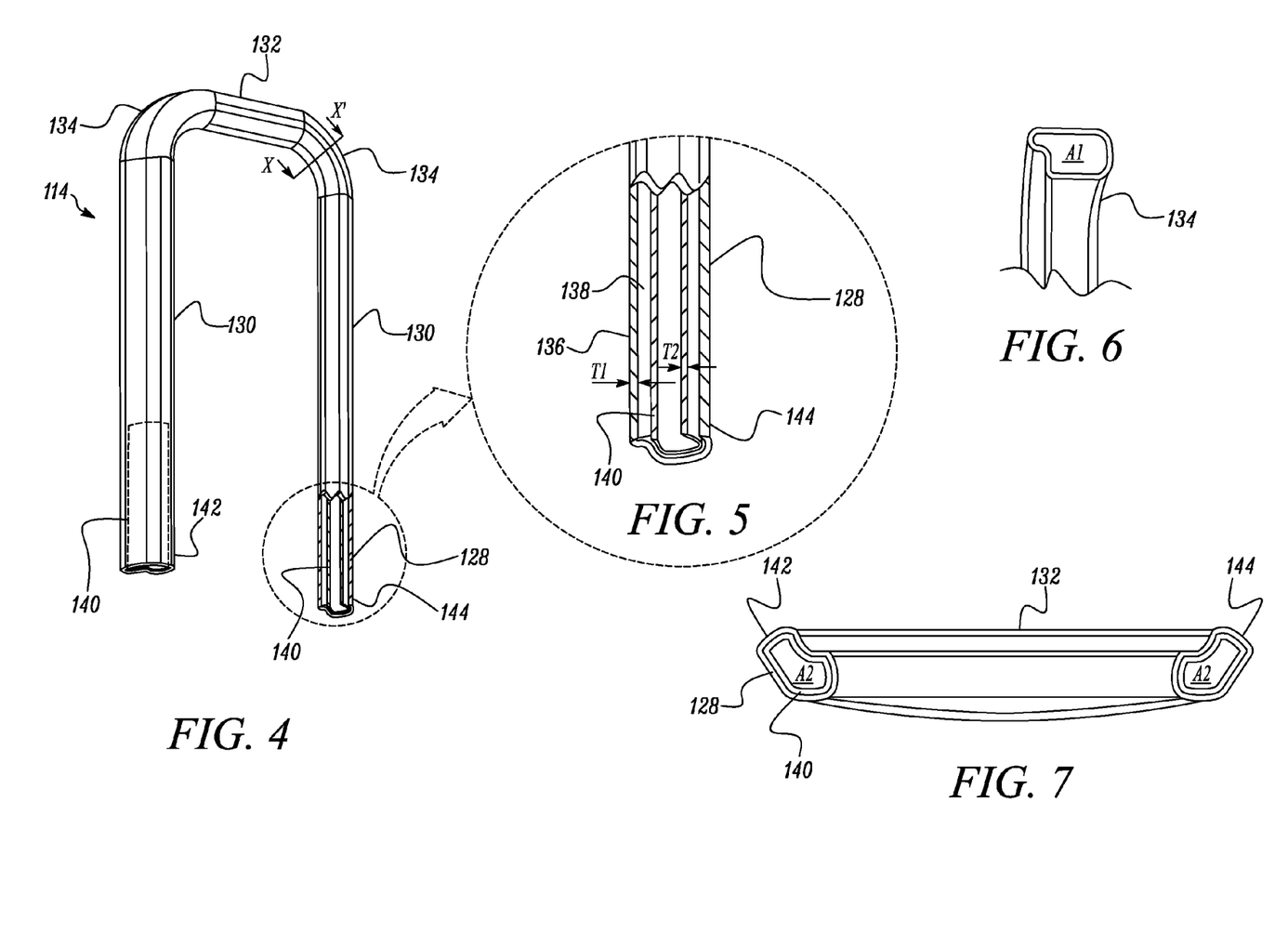
FIG. 4 illustrates a side view of a roll-over protection structure (ROPS) for use in the frame structure of the cab assembly.
FIG. 5 illustrates a magnified view of an end portion of the ROPS in FIG. 4.
FIG. 6 illustrates a cross-sectional view of the ROPS about XX' in FIG. 4.
FIG. 7 illustrates a bottom side of the ROPS in FIG. 4.

With additional reference to FIGS. 4-5 the ROPS 114 may include an outer tube 128 and one or more inner tubes 140 to define one or more composite ROPS tubes. For instance, a pair of composite ROPS tubes may be coupled to one another by the top side supports 122 and/or upper frame portion 118. The outer tube 128 may have a first pre-determined wall thickness T1, preferably in the range of about 4 mm to about 12 mm. According to an embodiment of the present disclosure, the composite tube, composed of the outer tube 128 and the inner tube 140, may have a U-shaped configuration, including upright supports 130 interconnected to one another by a transverse support 132. In one example, the U-shaped configuration of the composite tube is integrally formed from a unitary structure. The upright supports 130 may be configured to be disposed vertically relative to the machine 100 and substantially perpendicularly with respect to the top and bottom side supports 122, 124, of the frame structure 116. Further, a transition from the upright supports 130 to the transverse support 132 may define curved corners 134. The corners 134 may be configured to attach with the top side supports 122 by an attachment mechanism, such as, e.g., welding, mechanical fasteners (bolting or riveting) or the like. In an additional embodiment, the ROPS 114 may be made of modular structures which may be assembled to form the frame structure 116 of the cab assembly 102. The ROPS 114 may be made of a material for example, but not limited, metallic alloys, and composites.

The outer tube 128 may include an outer wall 136 and an inner wall 138. Further, the inner tube(s) 140 of the ROPS 114 (for example, two are shown in FIG. 4) may be disposed inside the outer tube 128 at one or more pre-determined locations, such as, at end portions 142, 144 of the outer tube 128. As illustrated in FIG. 5, a magnified view of the ROPS 114 at the end portion 144, the outer tube 128 is removed at the end portion 144 to show an example pre-determined location of the inner tube 140. The inner tube 140 may have a second pre-determined wall thickness T2, which can be in the range of about 2 mm to about 6 mm, and in some instances is less than T1. Furthermore, the inner tubes 140 may be coupled to the inner wall 138 of the outer tube 128 by a friction fit or by a fixedly secure attachment, such as, by welding. FIG. 6 illustrates a cross-section of the ROPS 114 about a plane XX' (see FIG. 4). As illustrated, the ROPS 114 may have a first cross-section A1 at the corner 134. Further, FIG. 7 illustrates a bottom view of the ROPS 114 and may have a second cross-section A2 at the end portions 142, 144. A person having skill in the art will understand that, the outer tube 128 and the inner tube 140 may have initially or result in a variety of geometric cross-sectional shapes, both regular and irregular, such as, circular, oval, triangular, rectangular without limiting the scope of the present disclosure. Further, it is appreciated that the listed sizes for the tubes are exemplary, and can be scaled up to large sizes or down to smaller sizes.

Figure 8:
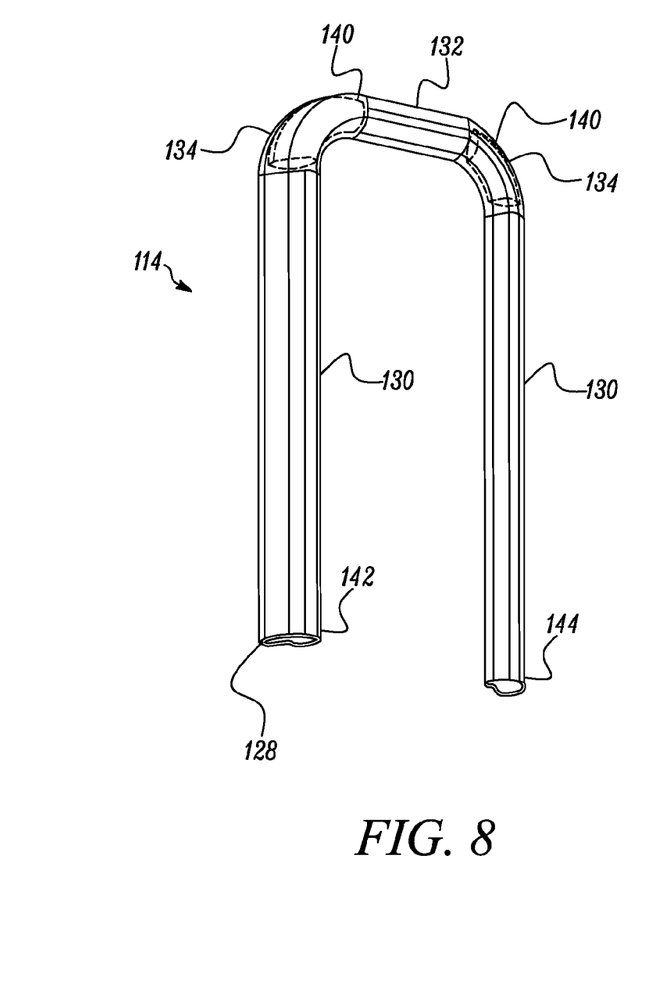
FIG. 8 illustrates a side view of a roll-over protection structure (ROPS) for use in the frame structure of the cab assembly.
Figure 9:
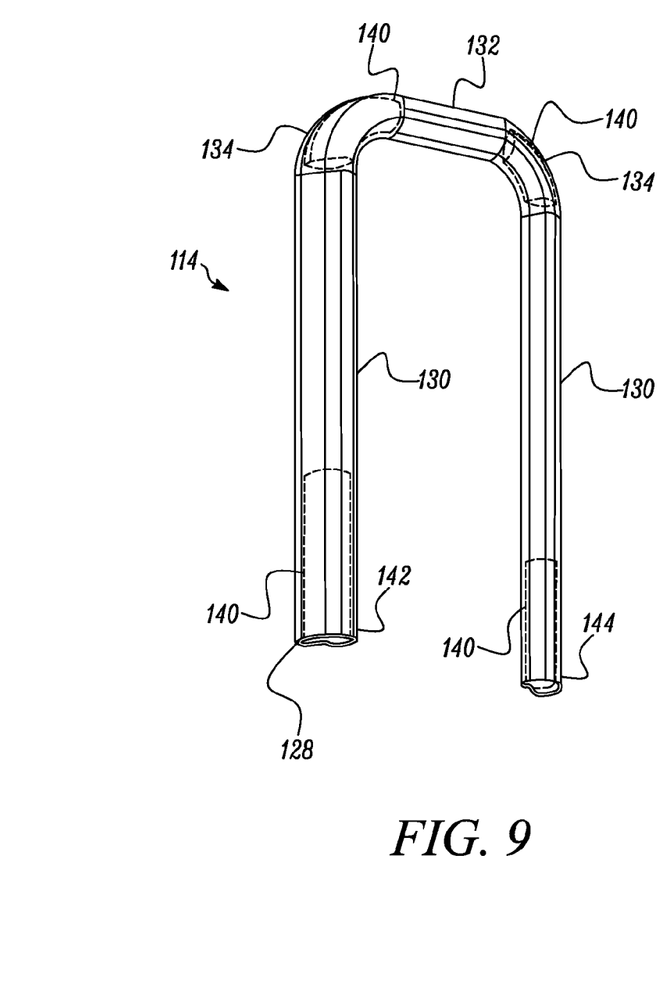
FIG. 9 illustrates a side view of a roll-over protection structure (ROPS) for use in the frame structure of the cab assembly.

FIGS. 8-9 illustrate other examples of the pre-determined locations of the inner tube 140 with respect to the outer tube 128. For example, the inner tubes 140 may be placed inside the outer tube 128 at the corners 134, as shown in FIG. 8. In another example, the inner tubes 140 may be placed inside the outer tube 128 at the end portions 142, 144 as well as at the corners 134, as shown in FIG. 9. Apart from the illustrated embodiments in FIGS. 4-9, in various other embodiments, the size and locations of the inner tubes 140 may be selected on the basis of application and anticipated loading conditions during the roll-over of the machine 100. According to another embodiment of the present disclosure, the ROPS 114 may constitute also the top and bottom side supports 122, 124 in the frame structure 116 of the cab assembly 102.

INDUSTRIAL APPLICABILITY

The present disclosure may relate to a roll-over protective structure adapted for use in a cab assembly in a machine as embodied in the present disclosure. The roll-over protection structure (ROPS) 114 may serve as a protective framework for the operator in an unlikely event of machine roll-over. The ROPS 114 may be fabricated in such a fashion so that it may withstand weight of the machine 100 in the event of the roll-over of the machine 100. In the event of a machine 100 roll-over, the forces that are normally applied to the ROPS would likely occur as side loads as the cab contacts any obstruction or ground. As the loads are applied to the cab assembly 102, the ROPS 114 may be configured to primarily deform at the end portions 142, 144 and/or the corners 134. In other words, the composite ROPS tubes have inner tube segments 140 along different portions of the outer tube 128. The inner tube 140 can be located at pre-determined locations that are strategically specified based on the estimated loading impact during a roll-over event. Further, the cross-sections of the pre-determined locations of the composite tube may be shaped differently than the rest of the composite tube to better withstand loading during a roll-over event. In one example, the pre-determined locations are the curved corners and the curved corners may have a different cross-sectional shape than another portion of the composite tube. In one example, the pre-determined locations are the curved corners and the end portions and each of these regions may have different cross-sectional shapes than other portions of the composite tube. In one example, the composite tube is composed of an outer tube 128 having a first pre-determined wall thickness in the range of about 4 mm to about 12 mm, and an inner tube 140 having a second pre-determined wall thickness in the range of about 2 mm to about 6 mm.

As described above, the top and bottom side supports 122, 124, vertically extended supports 130, the transverse supports 132, may be constituted as the ROPS 114, are structurally sufficient to withstand the forces mentioned above in an event of the roll-over. A person skilled in the art may understand that, the ROPS 114, as described in FIGS. 4-9, may be used as, EOPS (Excavator Operator Protection Structure), FOPS (Fall-over Protection Structure), SIPS (Side Impact Protection Structure), or AROPS (Automatically Deploying Roll-over Protection Structure). Moreover, the inner tubes 140 are well concealed and thus do not affect external appearance of the outer tube 128, leaving a smooth continuous outer wall surface 136.

Figure 10:
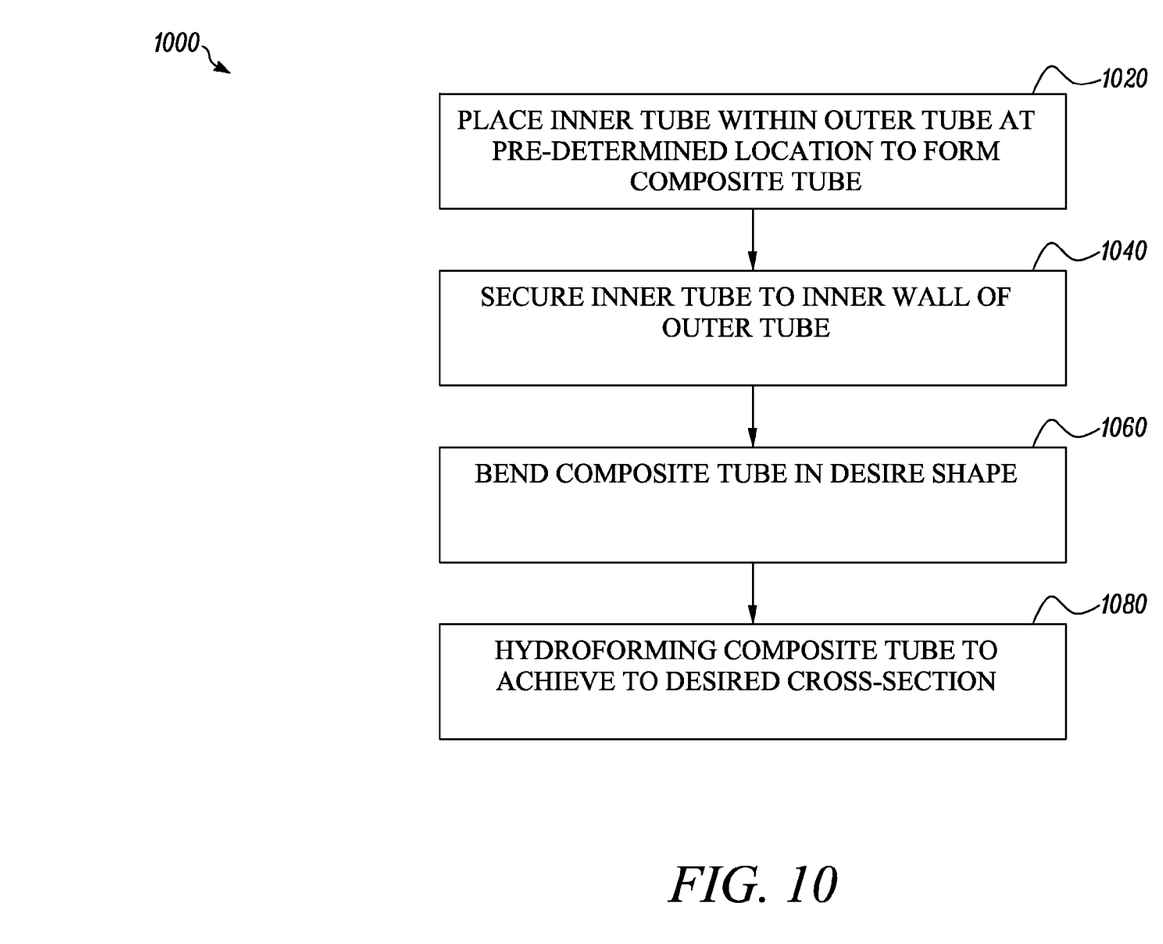
FIG. 10 illustrates a block diagram of method of fabricating the ROPS.
Figure 11:
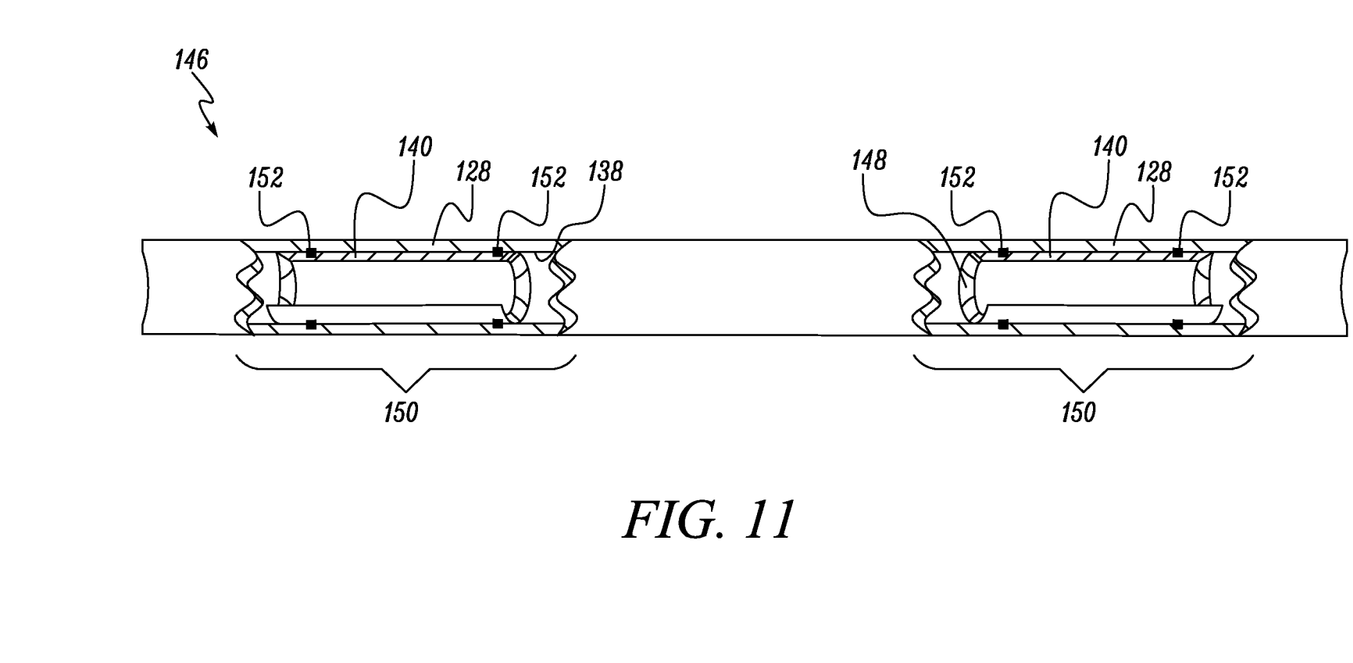
FIG. 11 illustrates a composite tube for use in fabricating the ROPS according to FIG. 10.

FIG. 10 illustrates a block diagram of a method 1000 of fabricating the ROPS 114 as a unitary structure. FIG. 11 illustrates a composite tube 146 fabricated from the method of FIG. 10, including the inner tubes 140 coaxially disposed within the outer tube 128. As illustrated in FIG. 11, the inner tubes 140 may have a chamfered surface 148 at one end or at both of the ends. At step 1020, of the method 1000, at least one inner tube 140 is placed within the outer tube 128 in a linear configuration at the one or more pre-determined locations 150 to form the composite tube 146 (see FIG. 11). The one or more pre-determined locations 150 may correspond to the end portions 142, 144 and/or the corners 134 of the ROPS 114. The pre-determined locations 150 may be identified based on expected loading on the frame structure 116 of the cab assembly 102 by finite element analysis (FEA). In a following step 1040, the inner tube 140 is secured to the inner wall 138 of the outer tube 128, for example, by interference fit or welding. In one example, electric resistance welding (ERW) may be utilized to join the inner tube 140 with the inner wall 138 of the outer tube 128 along at least one seam portion 152 by continuous welding. Alternatively, the inner tubes 140 may be plug welded within the outer tube 128. In this case, a plurality of holes may be provided on the outer tube 128 at regular intervals having a pre-determined size based on the thickness of the outer tube 128 and the inner tube 140. Finally, the holes may be filled with the weld. This may inhibit any dislocation of the inner tubes 140 during a following bending process as explained at step 1060.

Figure 12:
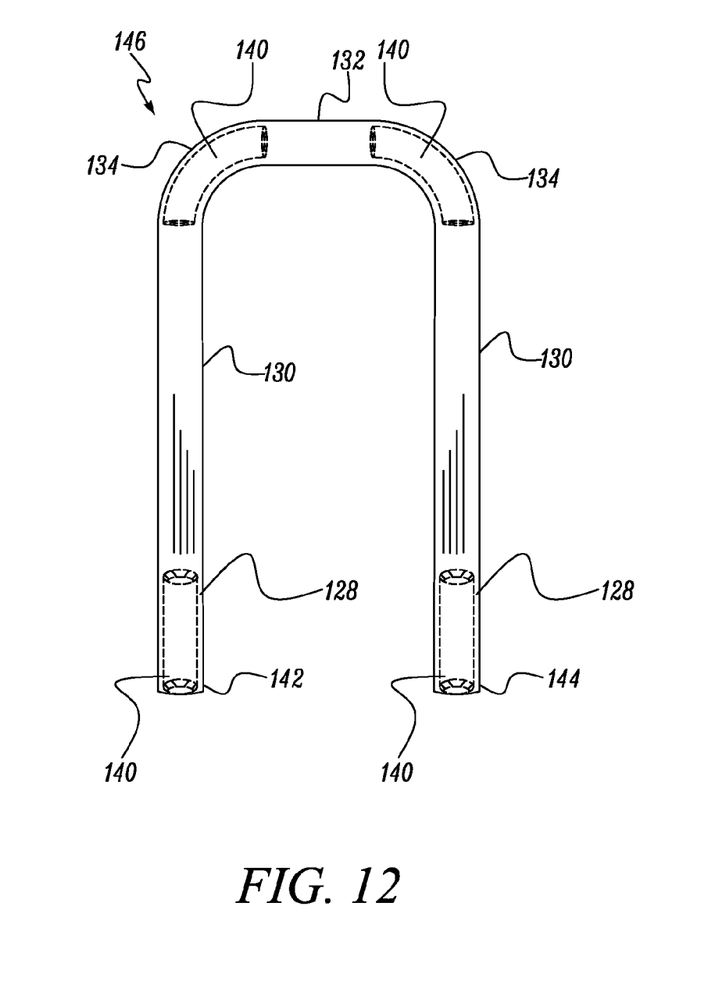
FIG. 12 illustrates a composite tube for use in fabricating the ROPS according to FIG. 10.

At step 1060, the composite tube 146 in a linear configuration may be bent in a desired shape, for example, a U-shaped composite tube 146, as shown in FIG. 12 by passing the linear composite tube 146 over a mandrel machine. The mandrel machine may be designed based on the shape and application requirements of the composite tube 146. In one example, a mandrel for bending is inserted into the composite tube 146. The mandrel can have an enlarged portion sized in close proximity to the inner diameter of the composite tube 146. The composite tube 146 in a linear configuration can be arranged to be brought into contact with the outer periphery of a bend die, which can be configured to bend the composite tube 146 at a desired angle. Facing the bend die, a clamp die is provided so that the composite tube 146 is held between the bend die and the clamp die. While the bending operation is performed, the bend die is configured to rotate and the clamp die is configured to move around the bend die. A pressure die may also be provided in line with the clamp die. The pressure die is configured to receive the bending reaction force induced while the composite tube 146 is being bent. For the bending operation, the composite tube 146 may be held between the bend die and the clamp die. The pressure die can be in an abutting relationship with the composite tube 146. The mandrel for bending may be inserted into the composite tube 146 in a manner such that an enlarged portion of the mandrel is placed at a desired location adjacent the composite tube 146 portion to be bent. While the bend die is rotated on its axis, the clamp die is rotated around the bend die. As a result, the composite tube 146 having the outer and inner tubes 128, 140 is wound around the bend die to its bent configuration.

In another embodiment, the composite tube 146 may be bent by using a specifically designed stepped mandrel. The stepped mandrel is configured to be disposed at the pre-determined locations 150, such as the corners 134 and provide a first bend and then at the end portions 142, 144 to provide a second bend in a subsequent bending process.

Finally, at step 1080, the U-shaped composite tube 146 is then passed into a hydroforming unit to achieve a desired cross-section and the pre-determined locations 150, such as the first cross-section area A1 at the corners 134 and the second cross-section area A2 at the end portions 142, 144 (see FIGS. 6-7). Furthermore, during hydroforming a substantially same degree of deformation of the inner tube 140 and the outer tube 128 may be achieved. During hydroforming, a highly pressurized fluid is used along with a set of hydroforming dies to shape the cross-section of the U-shaped composite tube 146 to a desired shape. At step 1080, the U-shaped composite tube 146 is loaded into the hydroforming dies and a sealing rod is engaged at one of the end portions 142, 144 of the composite tube 146. A fluid is filled inside the composite tube 146 from another end portion 142, 144 and the pressure of the fluid is increased such that the composite tube 146 takes the shape of the hydroforming dies. It can be appreciated that differently shaped hydroforming dies can be used along a single U-shaped composite tube 146 in order to achieve different cross-sectional shapes along different portions of the tube for more effective localized structural integrity. For example, the curved corner may have a first cross-section, and the end portion may have a second cross-section. As described above, the chamfered surface 148 provided at at least one of the ends of the inner tube 140 may facilitate a uniform flow of fluid during the hydroforming process. Moreover, during the hydroforming process the cross-section A1, A2/thickness T1, T2 of the outer tube 128 and the inner tube 140 may be tailored based on the rigidity and stiffness requirements of the ROPS 114.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of fabricating a roll-over protective structure comprising:

placing a first corner inner tube within an outer tube at a first pre-determined corner location to form a composite tube, wherein the outer tube has a first pre-determined wall thickness in the range of about 4 mm to about 12 mm, and the first corner inner tube has a second pre-determined wall thickness in the range of about 2 mm to about 6 mm, and wherein a first corner inner tube length is less than an outer tube length;

bending the outer tube and the first corner inner tube at the first pre-determined corner location such that the composite tube includes a first end portion and a first curved corner formed by a first bent portion of the outer tube at the first pre-determined corner location and by the bent first corner inner tube; and hydroforming the composite tube to create a desired corner cross-section at the first pre-determined corner location.

2. The method of claim 1, further including fixedly attaching the first corner inner tube to an inner wall of the outer tube.

3. The method of claim 2, wherein the fixedly attaching step includes forming a friction fit between the first corner inner tube and the outer tube.

4. The method of claim 2, wherein the fixedly attaching step includes welding the first corner inner tube to the outer tube.

5. The method of claim 1, further comprising:

placing a second corner inner tube at a second pre-determined corner location corresponding to a second curved corner of the composite tube;

bending the outer tube and the second corner inner tube at the second pre-determined corner location such that the composite tube includes the first end portion, the first curved corner, a second end portion, a second curved corner formed by a second bent portion of the outer tube at the second pre-determined corner location and by the bent second corner inner tube, and a transverse support between the first curved portion and the second curved portion; and hydroforming the composite tube to create the desired corner cross-section at the first pre-determined corner location and the second pre-determined corner location.

6. The method of claim 5, further comprising:

placing a first end inner tube in the outer tube at a first open end of the outer tube at the first end portion of the composite tube and a second end inner tube in the outer tube at a second open end of the outer tube at the second end portion of the composite tube; and hydroforming the composite tube at the first open end and the second open end to create a desired end cross-section at the first open end and the second open end that is different than the desired corner cross-section and an outer tube cross-section.

7. The method of claim 1, wherein the hydroforming step includes hydroforming to create the desired corner cross-section at the first curved corner and to create a desired end cross-section at the first end portion of the composite tube, wherein the desired end cross-section is different than the desired corner cross-section and an outer tube cross-section.

8. The method of claim 1, further including forming a plurality of holes through a wall of the outer tube, and applying a plug weldment through the holes to couple the first corner inner tube to the outer tube.

9. The method of claim 1, wherein the placing step includes placing a plurality of end inner tubes within the outer tube at pre-determined end locations to form the composite tube, wherein one of the end inner tubes is placed at a pre-determined end location corresponding to the end portion of the composite tube.

10. The method of claim 1, wherein the first corner inner tube has at least one end portion with chamfered surfaces on a tube inner surface to facilitate uniform flow of fluid during the hydroforming step.

11. The method of claim 1, wherein the bending step include bending the composite tube to have a U-shaped configuration including two upright supports having corresponding end portions, and a transverse support interconnecting the upright supports to define two curved corners.

12. The method of claim 11, wherein the placing step includes placing a first end inner tube at the first pre-determined end location corresponding to one of the end portions of the composite tube.

13. The method of claim 12, wherein the placing step includes placing the first corner inner tube at the first pre-determined corner location corresponding to one of the curved corners of the composite tube.

14. The method of claim 1, further including forming a pair of composite tubes and coupling the pair of composite tubes together with a top side support member.

15. The method of claim 1, wherein the first corner inner tube has a different wall thickness than the outer tube.

16. A method of fabricating a roll-over protective structure comprising placing one or more inner tubes within an outer tube at one or more pre-determined locations to form a composite tube, the inner tube having a different wall thickness than the outer tube;

bending the outer tube and a first corner inner tube to form a first curved corner, and the outer tube and a second corner inner tube to form a second curved corner of the composite tube such that the composite tube has a U-shaped configuration including a first upright support and a second upright support each having corresponding end portions, and a transverse support interconnecting the upright supports to define two curved corners, wherein the first curved corner is disposed between the first upright support and a first end of the transverse support and the second curved corner is disposed between the second upright support and a second end of the transverse support; and hydroforming the composite tube to create a desired corner cross-section at the first curved corner and the second curved corner.

17. The method of claim 16, wherein the first corner inner tube and the second corner inner tube each has at least one end portion with chamfered surfaces on a tube inner surface to facilitate uniform flow of fluid during the hydroforming step.

18. The method of claim 16, wherein a first end inner tube and the second end inner tube are placed at pre-determined end locations corresponding to each of the end portions of the composite tube.

19. The method of claim 18, wherein the hydroforming step includes hydroforming to create a desired corner cross-section at the curved corner and a desired end cross-section at the end portion of the composite tube that is different than the desired corner cross-section and an outer tube cross-section.

20. The method of claim 18, wherein the outer tube has a first pre-determined wall thickness in the range of about 4 mm to about 12 mm, and the first corner inner tube has a second pre-determined wall thickness in the range of about 2 mm to about 6 mm.

21. The method of claim 16, wherein the outer tube has a first pre-determined wall thickness in the range of about 4 mm to about 12 mm, and the first corner inner tube has a second pre-determined wall thickness in the range of about 2 mm to about 6 mm.

22. A method of fabricating a roll-over protective structure comprising:

placing a first corner inner tube within an outer tube at a first pre-determined corner location to form a composite tube, wherein the first corner inner tube has a different wall thickness than the outer tube;

bending the outer tube and the first corner tube at the first pre-determined corner location such that the composite tube includes a first end portion and a first curved corner formed by a first bent portion of the outer tube at the first pre-determined corner location and by the bent first corner inner tube; and hydroforming the composite tube to create a desired corner cross-section at the first pre-determined corner location.

23. A method of fabricating a roll-over protective structure comprising:

placing a first corner inner tube within an outer tube at a first pre-determined corner location to form a composite tube, wherein the first corner inner tube has at least one end portion with chamfered surfaces on a tube inner surface to facilitate uniform flow of fluid through the first corner inner tube and the outer tube;

bending the outer tube and the first corner tube at the first pre-determined corner location such that the composite tube includes a first end portion and a first curved corner formed by a first bent portion of the outer tube at the first pre-determined corner location and by the bent first corner inner tube; and hydroforming the composite tube to create a desired corner cross-section at the first pre-determined corner location.

24. The method of claim 23, wherein the first corner inner tube has a different wall thickness than the outer tube.

* * * * *